United States Patent [19]

Grund et al.

[11] 4,030,247

[45] June 21, 1977

[54] DEVICE FOR REMOVING BURRS FROM WORKPIECES

[75] Inventors: Peter Grund, Solingen; Jurgen Schmidt, Herborn; Jurgen Hesse, Dusseldorf, all of Germany

[73] Assignee: Messer Griesheim GmbH, Frankfurt am Main, Germany

[22] Filed: Apr. 14, 1976

[21] Appl. No.: 676,906

[30] Foreign Application Priority Data

Apr. 16, 1975 Germany .......................... 2516721

[52] U.S. Cl. ................................... 51/419; 51/425; 51/164; 241/176
[51] Int. Cl.² .......................................... B24C 3/18
[58] Field of Search ................ 51/13, 15, 164, 314, 51/319–321, 322; 241/176, 177

[56] References Cited

UNITED STATES PATENTS 2,540,358   2/1951   Symons .......................... 241/177 X

FOREIGN PATENTS OR APPLICATIONS 580,226   8/1946   United Kingdom .................. 51/13
808,521   2/1959   United Kingdom ................. 51/164

OTHER PUBLICATIONS

B311,910, Jan. 1975, Schmidt, 51/15 X.

*Primary Examiner*—Gary L. Smith
*Attorney, Agent, or Firm*—Connolly and Hutz

[57] ABSTRACT

Burrs are removed from workpieces by cold embrittlement in an axisymmetrical container having a rotatable bottom with stationary sides and with the liquefied gas being supplied along the axis of rotation of the bottom. The rotational axis is inclined 5° to 25° with respect to the vertical and the bottom wall is conical with a cone angle of 130°–170°.

13 Claims, 1 Drawing Figure

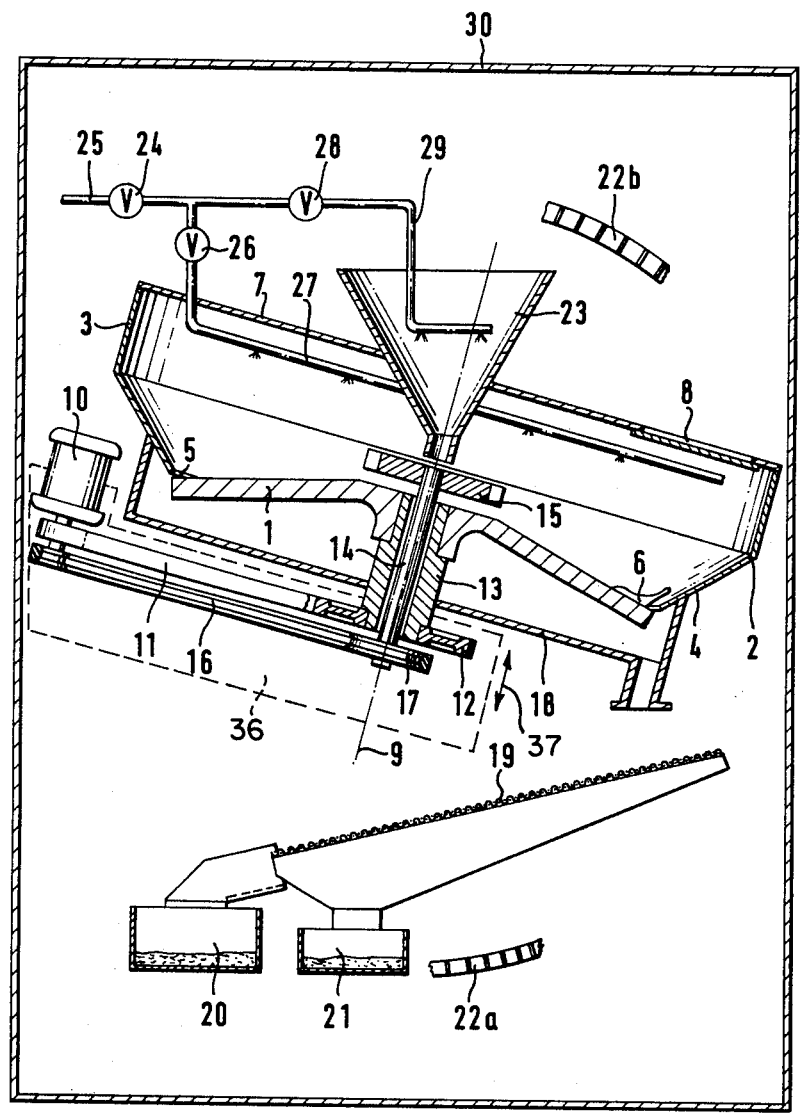

DEVICE FOR REMOVING BURRS FROM WORKPIECES

BACKGROUND OF THE INVENTION

The invention concerns a device for the purpose of removing burrs from workpieces made out of rubber or similar materials which can be embirtled by cold with an axisymmetrical container for the purpose of accepting the workpieces, the bottom of which is rotatable and the side wall of which is stationary, to which a liquefied gas with a low boiling point and a blasting agent can be supplied through a line by means of a fan blower having an axis of rotation identical to the axis of rotation of the bottom.

A device of this type is known from German Pat. No. 2,159,838, (U.S. Pat. No. 3,924,357) in which the rotational axis is vertical and in which the bottom element that can be rotated is designed as a trough with a horizontal floor. As a rule, good deburring results can be obtained with this device. In the case of many workpieces, particularly flat disk shaped ones, however, the deburring effect is not optimal. This is due to the fact that these workpieces are not rolled around sufficiently as a result of their geometric form.

SUMMARY OF THE INVENTION

For this reason, the object of the invention is to improve the known device in such a way that all workpieces can be deburred optimally independently of their specific shape.

In accordance with the invention, this is accomplished by means of the axis of rotation being inclined with respect to the vertical by 5° to 25°, and the bottom being the surface of a circular cone, the conical angle of which is 130° to 170°.

The combination of these two features is decisive for the effectiveness of the device in accordance with the invention. Neither the oblique setting of the axis of rotation alone nor the shaping of the bottom alone will produce an optimal deburring effect.

In the preferred form of embodiment, the axis of rotation is inclined 15° with respect to the vertical and the conical angle is 150°.

There is naturally a gap between the rotatable botttom and the stationary side wall. It is advantageous if the width of the gap can be adjusted arbitrarily within certain limits for good adaption of the device to the particular blasting agent being used which would be removed through this gap.

The stationary wall of the container can be designed as a circular cylinder. However, it is preferred that the wall consist of a cylindrical upper portion and a bottom portion shaped like a truncated cone which widens from the gap to the cylindrical portion. When this is done, the conical angle of the bottom portion can be 80° to 130°, and preferably 90° to 120°. The agitation of the workpiece as a result of centrifugal force is promoted particularly by this division or step of the wall, since the workpieces can push themselves up on the oblique bottom portion.

The agitation of the workpiece can be improved additionally in that mixing fingers, preferably three, are installed on the bottom which can be correspondingly rotated.

THE DRAWINGS

The single FIGURE shows an exemplified embodiment of the invention in schematic form. Details which are unessential for understanding the invention have been omitted.

DETAILED DESCRIPTION

The device in accordance with the invention consists of an axisymmetrical container for the purpose of accepting the workpieces which are to be deburred and which consists of a rotatable bottom and a stationary side wall 2. The stationary wall 2 is formed of a cylindrical upper portion 3 and a bottom portion 4 which is shaped like a truncated cone. A gap 5, the width of which can be varied by means of an adjustment device which is not described in greater detail, is located between the truncated cone bottom element 4 and the rotatable bottom 1. Such adjustmentdevice is schematically shown in phantom as 36 with arrow 37 indicating the direction of gap adjusting movement.

In accordance with the invention, the bottom 1 is part of the surface of a circular cone with an opening angle of 150°. The conical angle of the bottom element or lower section is 90°. Three mixing fingers 6 are fastened to the bottom 1. The container is provided with a cover 7 which has a closable opening 8 through which the workpieces to be deburred are place in the container.

In accordance with the invention, the rotational axis 9 of the bottom 1 is inclinded by 15° with respect to the vertical. The bottom 1 is driven by the electric motor 10 through a belt drive 11, a belt pulley 12, and the hollow shaft 13.

The shaft 14 to which the fan blower 15 is fastened is located inside of the hollow shaft 13. The shaft 14 is likewise driven by the electric motor 10, namely through the V-belt 16 and the V-belt pulley 17. The gear ratios are selected in such a way in this case that the fan blower 15 rotates considerably faster than the bottom 1. If desired separate drives can also be provided for the bottom 1 and the fan blower 15.

During operation, the blasting agent and the abraded material pass through the gap 5 into the collector pan 18 and from there to the vibration sieve 19. There is a separation of the abraded material from the blasting agent here. The abraded material is collected in container 20 and the blasting agent in container 21. The blasting agent is supplied and recirculated to the upper part of the device through a cellular transport wheel 22a and 22b which is not shown in detail, and falls from there into the collector funnel 23. From here, it passes into the fan blower 15 again. The separation of the abraded material from the blasting agent and the return transport of the blasting agent can also be accomplished by means of other well known devices.

The cooling is accomplished by means of liquid nitrogen which is supplied in the container through the line 25 which is provided with a valve 24 and through an additional valve 26 into the spray tube 27. Liquid nitrogen can also be sprayed into the collector funnel 23 through the valve 28 and the line 29 in order to cool the blasting agent. This is advantageous, for example, when a plastic granulate is used as the blasting agent. Plastic granulate does not cause any soiling of the surface in the case of light and colored rubber mixtures and does not cause any surface damage due to blasting damage. The cooling of the granulate in the collector funnel 23 below its freezing point also prevents the granulate from freezing together as a result of freezing out the atmospheric humidity. The addition of liquefied nitrogen can be regulated automatically and continuously variable working temperatures to approximately −150 C can be selected.

The entire device is surrounded by an insulation 30.

The delivery device for the workpieces which are to be deburred has not been shown. After expiration of the operating period for the batch, the device can be emptied by means of a discharge flap in the bottom portion 4 by means of turning the bottom 1 to the right or to the left.

The installation can be operated particularly economically if the nitrogen exhaust gas is used for the purpose of precooling the next batch of workpieces which are to be deburred. The device in accordance with the invention makes possible a very uniform deburring of all shaped elements. Compared to previous devices, the deburring is improved in holes, folds, corners, and shaped depressions even in the case of relatively large burrs. The shaped elements can be processed to the end directly as roughs from the multiple mold tool without preliminary treatment.

The agitation of workpieces consists of four essential factors:

1. Rolling from top to bottom due to the inclined rotational axis of the bottom 1.
2. Centrifugal force movement on the bottom 1 promoted by its design as a circular cone and the movement upward on the truncated cone bottom element 4 of wall 2.
3. Rotating of the workpiece around its own axis in the space between the bottom element 4 and the bottom 1, caused by the normal force components of the workpiece' own weight.
4. Mixing of flat workpieces with a great tendency to lie flat with mixing fingers.

Good protective agitation of shaped elements is the pre-requisite for short processing times and a good Gaussian standard distribution in the course of statistical quality control.

What is claimed is:

1. Device for removing burrs from workpieces made of rubber or similar materials which can be embrittled by cold comprising an axisymmetrical disposed container for receiving the workpieces, the bottom of said container being detached from the container side wall, means for rotating said bottom, said side wall being stationary, means for supplying a liquefied gas with a low boiling point and a blasting agent into said container, said supply means including a fan blower disposed within said container perpendicular to the axis of said container, the axis of rotation of said fan blower being coaxial and identical to the rotational axis of said bottom, said rotational axis being inclined by 5° to 25° with respect to the vertical, and said bottom having its outer surface in the form of a downwardly and outwardly extending circular cone with a conical angle of 130° to 170°.

2. Device in accordance with claim 1, wherein said rotational axis is inclined by 15° with respect to the vertical, and said conical angel is 150°.

3. Device in accordance with claim 2, wherein said bottom is spaced from said side wall with a gap therebetween, and means for adjusting the size of said gap.

4. Device in accordance with claim 3, wherein said side wall consists of a cylindrical upper section and a lower section shaped like a truncated cone which widens from said gap to said cylindrical section.

5. Device in accordance with claim 4, wherein the conical angle of said lower section is 80° to 130°.

6. Device in accordance with claim 5, wherein the conical angle of said lower section is 90° to 120°.

7. Device in accordance with claim 6, wherein a plurality of mixing fingers are fastened to said bottom.

8. Device in accordance with claim. 7 wherein there are three of said mixing fingers.

9. Device in accordance with claim 1, wherein said bottom is spaced from said side wall with a gap therebetween, and means for adjusting the size of said gap.

10. Device in accordance with claim 1, wherein said side wall consists of a cylindrical upper section and a lower section shaped like a truncated cone which widens from said gap to said cylindrical section.

11. Device in accordance with claim 1, wherein a plurality of mixing fingers are fastened to said bottom.

12. Device in accordance with claim 1, wherein a common drive comprises said rotating means for said bottom and the rotating means for said fan blower.

13. Device in accordance with claim 12, wherein said common drive includes a pair of concentric shafts with said fan blower being mounted on one of said shafts and said bottom being mounted on the other of said shafts.

* * * * *